June 10, 1930.   L. A. PARADISE   1,762,583
TWINE HOLDER FOR GRAIN BINDERS
Filed Oct. 31, 1928
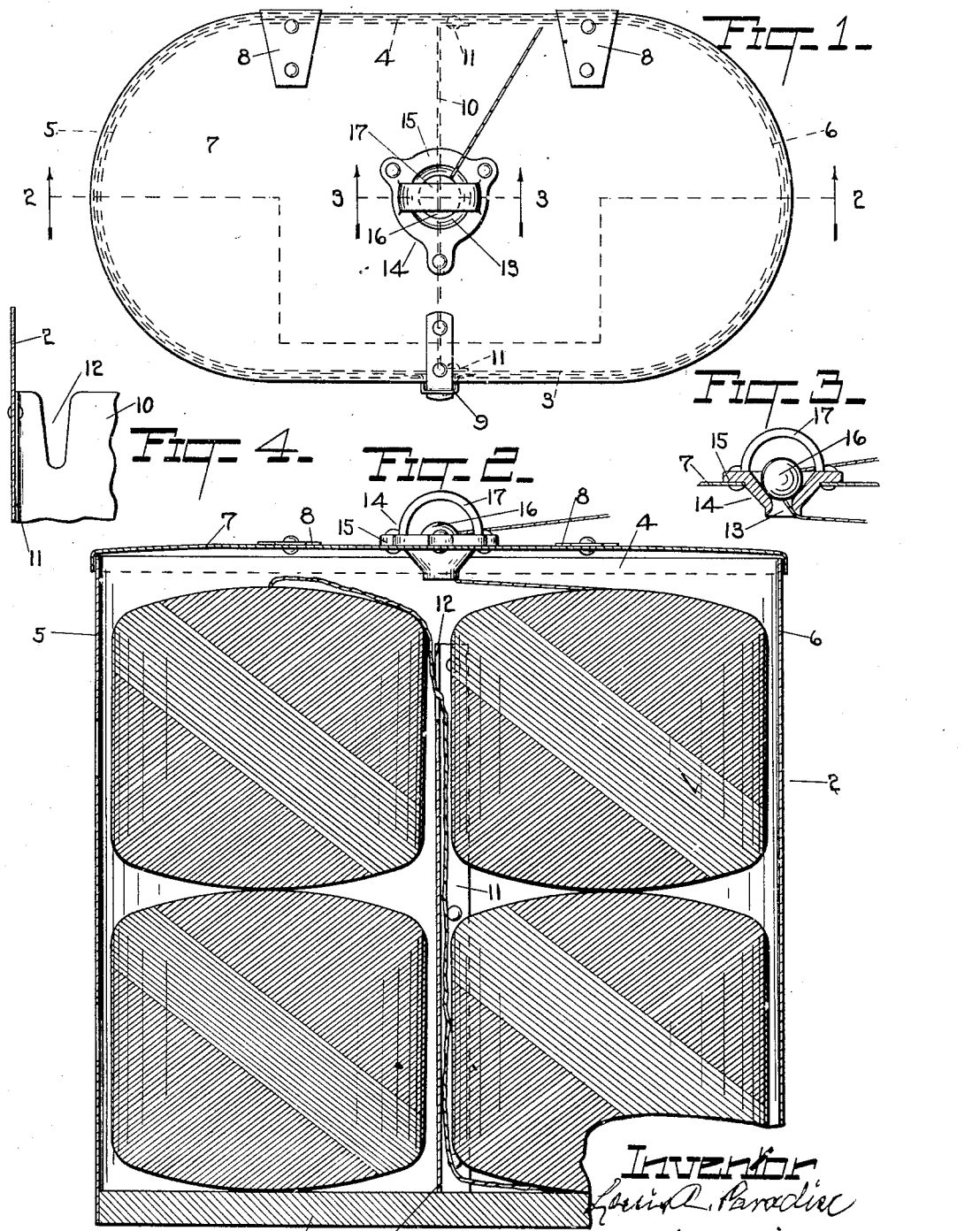

Patented June 10, 1930

1,762,583

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

TWINE HOLDER FOR GRAIN BINDERS

Application filed October 31, 1928. Serial No. 316,296.

My invention relates to devices commonly employed on grain harvesters and binders for holding a plurality of bundles of twine connected together for continuous withdrawal of the twine from the holder by operation of the binding mechanism of a harvester; and my invention has for its object to furnish a holder, to be mounted on a harvester, having a greater holding capacity, for balls of twine, than has heretofore been supplied in similar devices. Other objects are disclosed in the following specification.

Referring to the drawings, in which similar numerals indicate identical parts:

Fig. 1 is a plan view of my improved holder;

Fig. 2 is a section on the line 2—2 of Fig. 1;

Fig. 3 is a detail section on the line 3—3 of Fig. 1, and

Fig. 4 is a detail of part of the wall of the holder and the central partition which divides the interior of the holder into two compartments.

The holder comprises a base 1, preferably of wood, to which is secured the shell 2; the latter has parallel sides 3 and 4 integral with the rounded sides 5 and 6. A cover 7 is secured on the shell 2; by hinges 8 and is held in a closed position by a snap hasp 9, of the common type. A partition 10 divides the holder into two compartments; the vertical sides of the partition are bent to form flanges 11 fitting snugly to the sides 3 and 4 of the holder and fastened thereto by rivets. The partition 10 terminates below the top of the holder a sufficient distance to a space to allow free play of the twine as it is withdrawn, and in the top edge of the partition a deep notch 12 is provided. Each compartment holds two balls of twine connected together in the usual way, the strand of the bottom ball of one compartment leading over the partition 10, and through the notch 12, to the upper ball of the adjoining compartment to which it is connected.

The twine is drawn through a funnel-shaped opening 13 in a casting 14 projecting downwardly through the cover 7 and having a flange 15 riveted to the cover 7; the lower end of the opening 13 is flared with a rounded surface over which the twine passes more readily than if a rounded edge was not present. A freely movable ball 16 rests upon the strand of twine drawn through the opening 13 and by its weight gives sufficient tension to the strand as it passes through the opening. A semi-circular loop 17 retains the ball 16 in operative position, within the opening, and against loss; the loop 17 extends over the ball from side to side of the opening and is preferably integral with the casting 14.

Ordinarily a twine holder, as commonly used upon a harvester and binder, carries but two balls of twine which, in a heavy harvest, is quickly exhausted. To renew the supply necessitates a cessation of the operation of harvesting, and a consequent loss of time; therefore, to conserve time and labor, I have provided a holder in which four balls of twine can be carried and connected together and to the binding mechanism in the usual way. As the twine is drawn from the holder, it feeds readily through the opening 13, the weight of the ball 16, as stated, providing sufficient pressure on the twine, as it passes through the opening 13, to hold the strand taut between the opening 13 and the binding mechanism.

As the twine is drawn from the inside of the ball, and but little remains therein, the ball will collapse, and in a holder, such as I have shown and described, having a plurality of compartments containing balls of twine, the bottom ball of one compartment is connected to the top ball in the adjoining compartment, so that the supply of twine to the binder will be uninterrupted. It is possible that the collapse of the balls in the compartment being drawn from will become entangled with the strand of twine connected to the ball in the adjoining compartment and leading over the partition 10, and to prevent this entanglement, I have provided the notch 12, in the top edge of the partition 10, of sufficient depth to hold the strand of twine, leading from one compartment to the other, from possible entanglement with a collapsing ball.

It will be noted that the notch 12, in the partition 10, is located adjacent the joint of the partition with the shell 2, this location of the notch having a greater result in preventing entanglement of the twine when the ball, part of which leads through the notch, collapses, than if the notch should be located nearer to the exit of the twine from the holder.

I claim:

1. A twine holder having a movable cover; a central partition dividing said holder into two compartments; each compartment adapted to hold a plurality of balls of twine connected together; the balls in one compartment connected to the balls in the next compartment; and an opening in said cover through which the twine is withdrawn from the holder.

2. A twine holder having a movable cover; a central partition dividing said holder into two compartments; the partition secured to opposite sides of the holder and of a height to provide a space between the upper end and the cover; each compartment adapted to hold a plurality of balls of twine connected together; the balls of twine in one compartment connected, through said space, to the balls in the adjoining compartment; and a centrally disposed opening in said cover through which the twine is withdrawn from the holder.

3. A twine holder having a movable cover; a central partition dividing said holder into two compartments and secured to opposite sides of the holder; said partition of a height to provide a space between the upper end and the cover; a notch in the upper edge of said partition; each compartment adapted to hold a plurality of balls of twine connected together; the balls of twine in one compartment connected through said space and notch to the balls in the adjoining compartment; and a centrally disposed opening in said cover through which the twine is withdrawn from the holder.

4. A twine holder having a movable cover; a central partition dividing said holder into two compartments and secured to opposite sides of the holder, said partition of a height to provide a space between the upper end and the cover; a notch in the upper edge of said partition adjacent the side of the holder; each compartment adapted to hold a plurality of balls of twine connected together; the balls of twine in one compartment connected through said space and notch to the balls in the adjoining compartment; and a centrally disposed opening in said cover through which the twine is withdrawn from the holder.

5. A twine holder having a movable cover; a central partition dividing said holder into two compartments and secured to opposite sides of the holder; sand partition of a height to provide a space between the upper end and the cover; a notch in the upper edge of said partition between the center thereof and the side of the holder; each compartment adapted to hold a plurality of balls of twine connected together; the balls of twine in one compartment connected through said space and notch to the balls in the adjoining compartment; and a centrally disposed opening in said cover through which the twine is withdrawn from the holder.

LOUIS A. PARADISE.